(12) United States Patent
Hori

(10) Patent No.: US 11,764,841 B2
(45) Date of Patent: Sep. 19, 2023

(54) WIRELESS COMMUNICATION DEVICE, CONTROL CIRCUIT, WIRELESS COMMUNICATION METHOD, AND STORAGE MEDIUM

(71) Applicant: MITSUBISHI ELECTRIC CORPORATION, Tokyo (JP)

(72) Inventor: Yuta Hori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/539,643

(22) Filed: Dec. 1, 2021

(65) Prior Publication Data
US 2022/0094406 A1  Mar. 24, 2022

Related U.S. Application Data

(63) Continuation of application No. PCT/JP2019/032710, filed on Aug. 21, 2019.

(51) Int. Cl.
*H04B 7/06* (2006.01)
*H04L 27/12* (2006.01)
*H04L 27/26* (2006.01)

(52) U.S. Cl.
CPC .............. *H04B 7/06* (2013.01); *H04L 27/12* (2013.01); *H04L 27/2626* (2013.01)

(58) Field of Classification Search
CPC ........ H04L 27/10; H04L 27/12; H04L 27/122
See application file for complete search history.

(56) References Cited

U.S. PATENT DOCUMENTS

2017/0085407 A1   3/2017  Agee et al.

FOREIGN PATENT DOCUMENTS

| CN | 108900222 A | 11/2018 | |
| EP | 3 220 591 A1 | 9/2017 | |
| JP | 55-73147 A | 6/1980 | |
| JP | 61-136332 A | 6/1986 | |
| KR | 20080022643 A * | 3/2008 | ........... H04B 7/0417 |
| WO | WO-2006027502 A2 * | 3/2006 | ........... H04L 1/0618 |

OTHER PUBLICATIONS

Extended European Search Report for European Application No. 19942021.7, dated Jul. 19, 2022.
Indian Office Action for Indian Application No. 202147058863, dated Jul. 4, 2022, with English translation.
(Continued)

*Primary Examiner* — Kevin Kim
(74) *Attorney, Agent, or Firm* — BIRCH, STEWART, KOLASCH & BIRCH, LLP

(57) ABSTRACT

A wireless communication device includes: a plurality of transmitting antennas; a modulation unit that generates a transmission signal transmitted from each of the transmitting antennas by performing frequency-shift keying on a carrier wave on the basis of transmission data; and a mapping unit that is provided in a preceding stage of the modulation unit and allocates carrier waves different from each other to the plurality of transmitting antennas such that a plurality of transmission signals each transmitted from one of the plurality of transmitting antennas are orthogonal to each other.

10 Claims, 3 Drawing Sheets

(56) References Cited

OTHER PUBLICATIONS

Alamouti, "A simple transmit diversity technique for wireless communications," IEEE Journal on Select Areas in Communications, Oct. 1998, vol. 16, No. 8, pp. 1451-1458.
Bauch. "Differential Modulation and Cyclic Delay Diversity in Orthogonal Frequency-Division Multiplex." IEEE Transactions on Communications, May 2006, vol. 54, No. 5, pp. 798-801.
International Search Report (PCT/ISA/210) issued in PCT/JP2019/032710 dated Oct. 9, 2019.
Written Opinion (PCT/ISA/237) issued in PCT/JP2019/032710 dated Oct. 9, 2019.
Office Action dated Jan. 30, 2023 in corresponding European Patent Application No. 19942021.7.
European Communication pursuant to Article 94(3) EPC for European Application No. 19942021.7, dated Jun. 13, 2023.

\* cited by examiner

| $b_1b_2$ | $k_1$ | $k_2$ |
|---|---|---|
| 00 | 1 | 4 |
| 01 | 2 | 1 |
| 11 | 3 | 2 |
| 10 | 4 | 3 | ns
WIRELESS COMMUNICATION DEVICE, CONTROL CIRCUIT, WIRELESS COMMUNICATION METHOD, AND STORAGE MEDIUM

CROSS-REFERENCE TO RELATED APPLICATION

This application is a continuation application of International Application PCT/JP2019/032710, filed on Aug. 21, 2019, and designating the U.S., the entire contents of which are incorporated herein by reference.

BACKGROUND OF THE INVENTION

1. Field of the Invention

The disclosure relates to a wireless communication device, a control circuit, a wireless communication method, and a storage medium using a transmission diversity technique.

2. Description of the Related Art

Transmission diversity is one of the techniques for easily improving transmission quality in a wireless communication system. The transmission diversity is a technique for improving transmission quality by a spatial diversity effect by transmitting signals based on the same information from a plurality of transmitting antennas to cause respective transmission signals to reach a reception device under the influence of different propagation paths.

Non Patent Literature 1 "G. Bauch, "Differential Modulation and Cyclic Delay Diversity in Orthogonal Frequency-Division Multiplex.", IEEE TPANSACTIONS ON COMMUNICATIONS, VOL. 54, NO. 5, pp. 798-801, May 2006" discloses a technique called cyclic delay diversity (CDD). The cyclic delay diversity is a technique for obtaining a diversity effect by providing delays different from each other to signals each transmitted from one of a plurality of antennas in block transmission to artificially create frequency selectivity. The cyclic delay diversity can also be said to be a technique for converting spatial diversity by a plurality of antennas into frequency diversity.

In addition, among modulation techniques used in a wireless communication system, frequency-shift keying (FSK) exhibits a constant envelope amplitude of a modulation signal and enables an input back-off value to be set small on a power amplifier, so that frequency shift keying is known to have higher power efficiency than phase shift keying (PSK), quadrature amplitude modulation (QAM), and the like. Also in a communication system using the frequency-shift keying, it is desirable to improve transmission quality by introducing a transmission diversity technique.

However, when the technique described in Non Patent Literature 1 is applied to a communication system using frequency-shift keying, a signal is intentionally distorted and thereby transmission quality is deteriorated in principle, which is a problem.

SUMMARY OF THE INVENTION

In order to solve the above-described problems and achieve the object, a wireless communication device according to the disclosure includes: a plurality of transmitting antennas; a modulation unit to generate a transmission signal transmitted from each of the transmitting antennas by performing frequency-shift keying on a carrier wave on a basis of transmission data; and a mapping unit provided in a preceding stage of the modulation unit to allocate carrier waves different from each other to the plurality of transmitting antennas such that a plurality of transmission signals each transmitted from one of the plurality of transmitting antennas are orthogonal to each other.

DETAILED DESCRIPTION OF THE PREFERRED EMBODIMENTS

Hereinafter, a wireless communication device, a control circuit, a wireless communication method, and a storage medium according to embodiments of the disclosure will be described in detail with reference to the drawings.

Embodiment

Figures 1, 2:
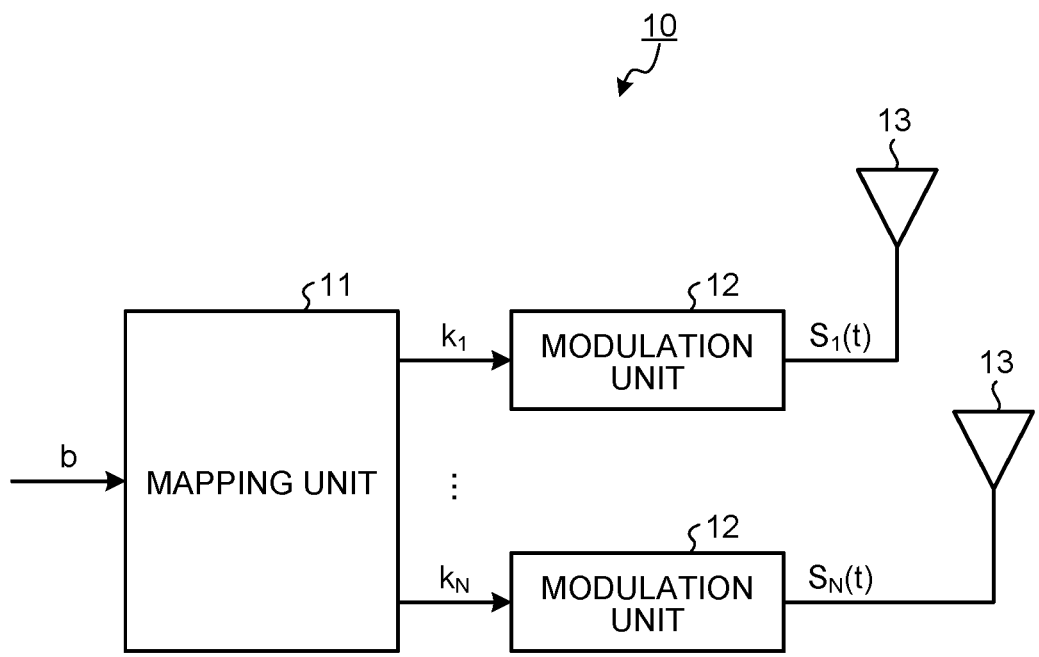
FIG. 1 is a diagram illustrating a functional configuration of a wireless transmission device according to an embodiment.
FIG. 2 is a diagram illustrating an example of a mapping rule used by a mapping unit illustrated in FIG. 1.

FIG. 1 is a diagram illustrating a functional configuration of a wireless transmission device 10 according to an embodiment. The wireless transmission device 10 is a wireless communication device including a mapping unit 11, a plurality of modulation units 12, and a plurality of transmitting antennas 13. The plurality of modulation units 12 are provided in one-to-one correspondence to the plurality of transmitting antennas 13.

The mapping unit 11 is provided in a preceding stage of the plurality of modulation units 12. The mapping unit 11 allocates carrier waves different from each other to the plurality of modulation units 12. At that time, the mapping unit 11 allocates the carrier waves such that the transmission signals each transmitted from one of the plurality of transmitting antennas 13 are orthogonal to each other on a frequency axis. Therefore, the mapping unit 11 can also be referred to as a signal processing unit that performs an encoding process on a signal before modulation for transmission diversity.

Bit sequence $b=\{b_1, b_2, \ldots b_m\}$ is input to the mapping unit 11. Here, m is the number of bits per modulation symbol, and when M is an FSK modulation level, $m=\log_2 M$ holds. Regarding the modulation units 12 each corresponding to one of the transmitting antennas 13, the mapping unit 11 outputs, to each of the modulation units 12, an FSK carrier number $k_t$ which is a number for identifying a carrier wave used by the modulation unit 12 depending on a value of the input bit sequence b. In a case where the number of transmitting antennas is denoted by N and an FSK modulation index is denoted by a, the FSK carrier number $k_i$ of the carrier wave used in an i-th (1≤i≤N) modulation unit 12 is expressed by using the following formula (1).

[Formula 1]

$$k_i = \{\psi(b)+(i-1)\cdot K\} \bmod M \quad (1)$$

In formula (1), mod represents a modulo operation. In addition, K is a minimum carrier interval at which two carrier waves are orthogonal to each other, and is expressed by the following formula (2). By using formula (1), the mapping unit 11 defines a mapping rule which is an allocation rule of the carrier waves on the basis of the number N of antennas of the transmitting antennas 13, and the FSK modulation level M and the FSK modulation index α of the modulation unit 12.

[Formula 2]

$$K = \left\lceil \frac{0.5}{\alpha} \right\rceil \quad (2)$$

Ψ(b) is a mapping function that makes the bit sequence b and the FSK carrier number $k_i$ correspond to each other on a one-to-one basis, and in general, mapping based on gray labeling is used.

FIG. 2 is a diagram illustrating an example of a mapping rule used by the mapping unit 11 illustrated in FIG. 1. FIG. 2 illustrates a case of N=2, M=4, and α=0.5. In the example illustrated in FIG. 2, combinations of the FSK carrier numbers $k_1$ and $k_2$ are different for all values "00, 01, 11, and 10" of an information bit sequence to be input. Therefore, the mapping unit 11 allocates the carrier waves such that the combinations of the carrier waves each allocated to one of the plurality of transmitting antennas 13 are different for all values of the information bit sequence to be input.

The modulation units 12 each generate a transmission signal to be transmitted from the transmitting antenna 13 by performing frequency-shift keying on a carrier wave on the basis of transmission data. The modulation units 12 each perform a frequency-shift keying process using the carrier wave allocated by the mapping unit 11. Specifically, first, the modulation units 12 each determine an initial phase of an FSK modulation symbol of the transmitting antenna 13. The initial phase of an i-th transmitting antenna 13 is expressed by the following formula (3). By determining the initial phase using formula (3), the modulation units 12 can use initial phases different from each other for the plurality of transmitting antennas 13.

[Formula 3]

$$\phi_i = \frac{2\pi}{N} i \quad (3)$$

The modulation units 12 each generate an FSK modulation symbol on the basis of the FSK carrier number $k_i$ output by the mapping unit 11 and an initial phase $\varphi_i$ determined above. An FSK modulation symbol $S_i(t)$ generated here is expressed by the following formula (4).

[Formula 4]

$$S_i(t) = \cos(2\pi f_c t + 2\pi(2k_i - 1 - M)\Delta f t + \phi_i) \quad (4)$$

Here, fc is a center frequency, and 2Δf is a frequency interval between carrier waves. The modulation units 12 each transmit the generated FSK modulation symbol $S_i(t)$ from the transmitting antenna 13.

Figure 3:
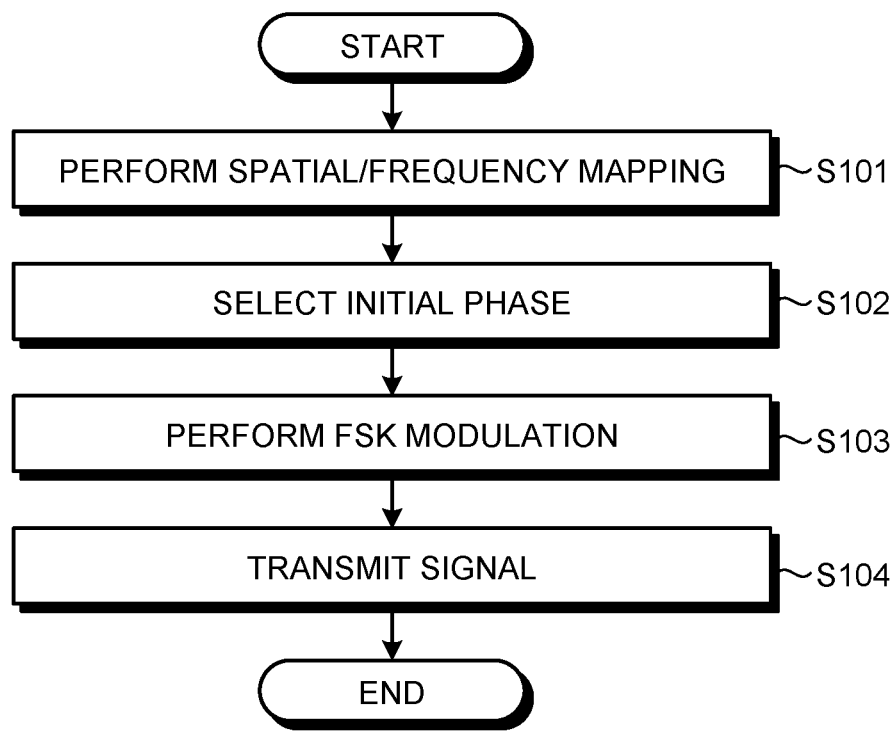
FIG. 3 is a flowchart for explaining an operation of the wireless transmission device illustrated in FIG. 1.

FIG. 3 is a flowchart for explaining an operation of the wireless transmission device 10 illustrated in FIG. 1. The mapping unit 11 first performs a spatial/frequency mapping process (step S101). Specifically, the mapping unit 11 allocates a carrier wave to each transmitting antenna 13, and outputs the FSK carrier number $k_i$ for identifying the allocated carrier wave to each of the plurality of modulation units 12.

The modulation units 12 each select an initial phase of the FSK modulation symbol (step S102). The modulation units 12 each perform an FSK modulation process using the initial phase selected in step S102 and the carrier wave of the FSK carrier number $k_i$ allocated by the mapping unit 11 (step S103). As a result, a signal including the FSK modulation symbol is generated. The modulation units 12 each transmit the generated signal from the transmitting antenna 13 (step S104).

Figure 4:
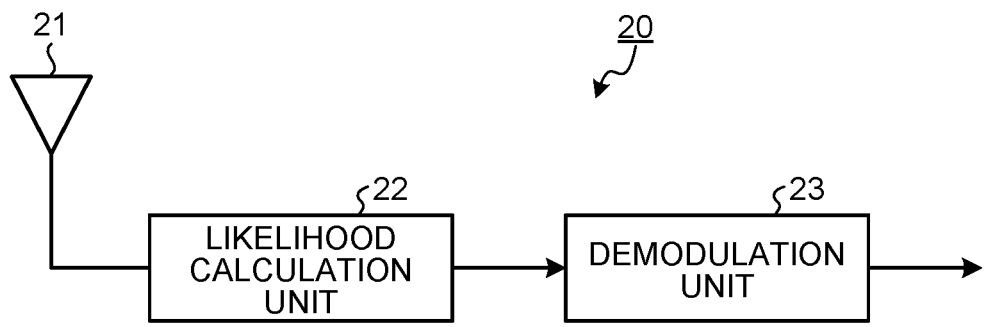
FIG. 4 is a diagram illustrating a functional configuration of a wireless reception device according to the embodiment.

FIG. 4 is a diagram illustrating a functional configuration of a wireless reception device 20 according to the embodiment. The wireless reception device 20 is a wireless communication device including a receiving antenna 21, a likelihood calculation unit 22, and a demodulation unit 23.

The likelihood calculation unit 22 calculates symbol likelihoods each corresponding to one of M number of FSK symbol candidates from frequency components of reception signals received by the receiving antenna 21. The likelihood calculation unit 22 outputs the calculated symbol likelihoods to the demodulation unit 23. Note that the likelihood calculation unit 22 may use power of each frequency component as the likelihood, or may use a Euclidean distance in a complex space as the likelihood on the basis of a complex value of each frequency component.

The demodulation unit 23 calculates bit sequence likelihoods corresponding to M number of information bit sequence candidates on the basis of M number of symbol likelihoods output by the likelihood calculation unit 22 and the mapping rule defined by formula (1). The demodulation unit 23 obtains an estimation value b (hat) of the information bit sequence by performing maximum likelihood estimation on the basis of the calculated bit sequence likelihoods. Note that, in a case where (hat) is described after a character, it means that ^ is added above the character.

Figure 5:
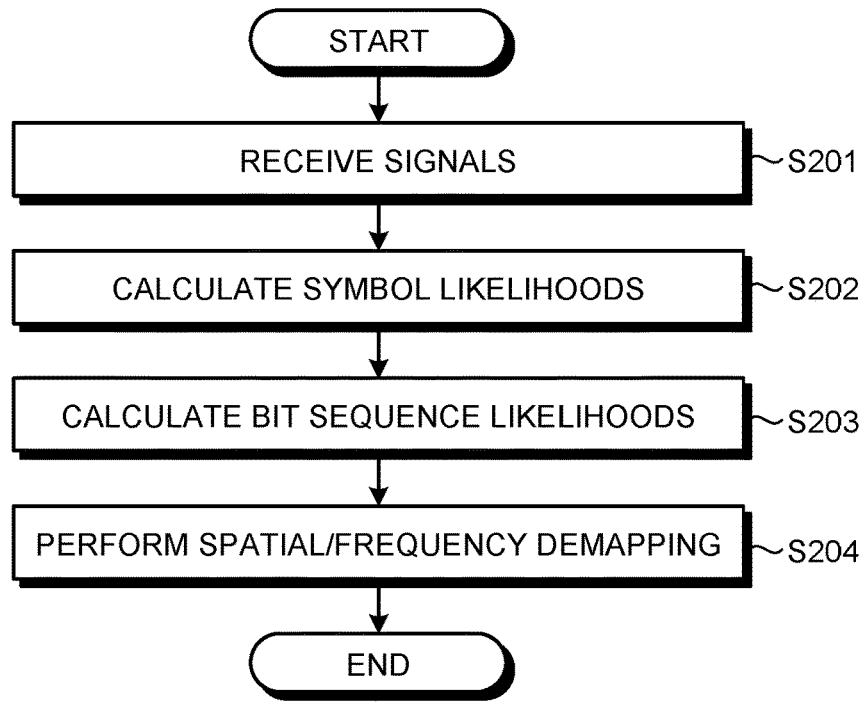
FIG. 5 is a flowchart for explaining an operation of the wireless reception device illustrated in FIG. 4.

FIG. 5 is a flowchart for explaining an operation of the wireless reception device 20 illustrated in FIG. 4. The wireless reception device 20 receives signals at the receiving antenna 21 (step S201). The likelihood calculation unit 22 calculates symbol likelihoods each corresponding to one of the M number of FSK symbol candidates on the basis of frequency components of the reception signals received by the receiving antenna 21 (step S202). The likelihood calculation unit 22 outputs the plurality of symbol likelihoods to the demodulation unit 23.

The demodulation unit 23 calculates bit sequence likelihoods corresponding to the M number of information bit sequence candidates on the basis of the plurality of symbol likelihoods and the mapping rule (step S203). The demodulation unit 23 obtains an estimation value b (hat) of the information bit sequence by performing a spatial/frequency demapping process (step S204). Specifically, the demodulation unit 23 obtains the estimation value b (hat) of the information bit sequence by performing maximum likelihood estimation based on the calculated bit sequence likelihoods.

Next, hardware configurations of the wireless transmission device 10 and the wireless reception device 20 according to the embodiment will be described. The mapping unit 11, the modulation units 12, the likelihood calculation unit 22, and the demodulation unit 23 are implemented by processing circuitry. The processing circuitry may be implemented by dedicated hardware, or may be a control circuit using a central processing unit (CPU).

Figure 6:
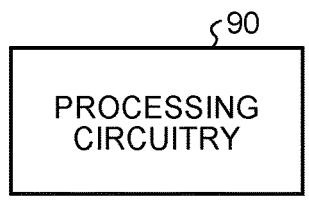
FIG. 6 is a diagram illustrating dedicated hardware for implementing functions of the wireless transmission device and the wireless reception device according to the embodiment.

In a case where the above-described processing circuitry is implemented by dedicated hardware, functions of the mapping unit 11, the modulation units 12, the likelihood calculation unit 22, and the demodulation unit 23 are each implemented by processing circuitry 90 illustrated in FIG. 6. FIG. 6 is a diagram illustrating dedicated hardware for implementing the functions of the wireless transmission device 10 and the wireless reception device 20 according to the embodiment. The processing circuitry 90 is a single circuit, a composite circuit, a programmed processor, a parallel programmed processor, an application specific integrated circuit (ASIC), a field programmable gate array (FPGA), or a combination thereof.

Figure 7:
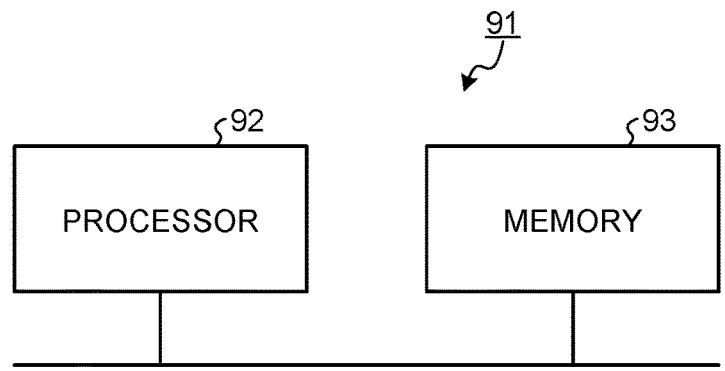
FIG. 7 is a diagram illustrating a configuration of a control circuit for implementing the functions of the wireless transmission device and the wireless reception device according to the embodiment.

In a case where the above-described processing circuitry is implemented by a control circuit using a CPU, the functions of the mapping unit 11, the modulation units 12, the likelihood calculation unit 22, and the demodulation unit 23 are implemented by, for example, a control circuit 91 having a configuration illustrated in FIG. 7. FIG. 7 is a diagram illustrating a configuration of the control circuit 91 for implementing the functions of the wireless transmission device 10 and the wireless reception device 20 according to the embodiment. As illustrated in FIG. 7, the control circuit 91 includes a processor 92 and a memory 93. The processor 92 is a CPU, and also referred to as a central processing device, a processing device, an arithmetic device, a microprocessor, a microcomputer, a digital signal processor (DSP), or the like. The memory 93 is, for example, a non-volatile or volatile semiconductor memory such as a random access memory (RAN), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disk (DVD).

In a case where the above-described processing circuitry is implemented by the control circuit 91, the functions of the mapping unit 11, the modulation units 12, the likelihood calculation unit 22, and the demodulation unit 23 are described as programs and stored in the memory 93. The functions of the mapping unit 11, the modulation units 12, the likelihood calculation unit 22, and the demodulation unit 23 are implemented by the processor 92 reading and executing a program stored in the memory 93. The memory 93 is also used as a temporary memory in each process executed by the processor 92. A part of the above functions may be implemented by dedicated hardware, and the rest thereof may be implemented by a program.

In the above, the wireless transmission device 10 and the wireless reception device 20 have been described as devices separate from each other, but a wireless communication device having the functions of the wireless transmission device 10 and the wireless reception device 20 may be provided.

As described above, the wireless communication device according to the embodiment includes the mapping unit 11 provided in the preceding stage of the modulation units 12. The mapping unit 11 allocates carrier waves different from each other to the plurality of transmitting antennas 13. That is, a transmission diversity process by the mapping unit 11 is performed in the preceding stage of the modulation units 12, and a signal obtained after frequency-shift keying is transmitted without being processed. Therefore, no phase discontinuity occurs in a case of the FSK modulation index $\alpha=1.0$, and high power efficiency can be maintained.

Furthermore, the mapping unit 11 allocates the carrier waves such that the plurality of transmission signals each transmitted from one of the plurality of transmitting antennas 13 included in the wireless communication device are orthogonal to each other. With such a configuration, the signals each transmitted from one of the transmitting antennas 13 are orthogonal to each other on the frequency axis, and thus, full diversity can be acquired in a case of N<M in which there occurs one-to-one correspondence of combinations of respective values of the bit sequence b and the carrier waves. Therefore, it is possible to achieve high transmission quality compared with a case of using a technique of cyclic delay diversity that provides delays different from each other to signals each transmitted from one of the plurality of antennas in block transmission to artificially create frequency selectivity.

Furthermore, in the present embodiment, the orthogonality of the transmission signals from the transmitting antennas 13 is guaranteed in a closed form in one FSK modulation symbol. Therefore, it is possible to enhance resistance to a time variation of a communication path.

In the present embodiment, initial phases allocated to the transmitting antennas 13 are different from each other. With such a configuration, it is possible to increase a minimum distance between signal points in a signal point space formed by bit sequence likelihoods as compared with a case where the initial phases are the same. Therefore, transmission quality can be improved.

The wireless communication device according to the disclosure achieves an effect that it is possible to improve transmission quality while maintaining power efficiency.

The configurations described in the embodiments above are merely examples and can be combined with other known technology and part thereof can be omitted or modified without departing from the gist. The disclosure can also be used in combination with any secondary modulation technique such as orthogonal frequency-division multiplexing (OFDM) or direct sequence spread spectrum (DSSS), and high transmission quality which is an effect of the disclosure can be achieved also in that case. For example, in a case where OFDM and the technology of the disclosure are combined, improvement in spectral efficiency can be expected, and in a case where DSSS and the technology of the disclosure are combined, improvement in interference immunity by a processing gain can be expected.

What is claimed is:

1. A wireless communication device comprising:
a plurality of transmitting antennas;
a plurality of modulators each provided corresponding to one of the plurality of transmitting antennas to generate transmission signals transmitted from the transmitting antennas corresponding thereto; and
mapping circuitry provided in a preceding stage of the plurality of modulators to allocate a number for identifying a carrier wave to each of the plurality of modulators on a basis of an input information bit sequence such that a plurality of transmission signals each transmitted from one of the plurality of transmitting antennas are orthogonal to each other, wherein
the number for identifying the carrier wave allocated to each of the plurality of modulators is determined based on a minimum carrier interval at which two carrier waves of the carrier waves are orthogonal to each other,
the mapping circuitry allocates numbers different from each other to the plurality of modulators, and
each of the plurality of modulators generates the transmission signal by performing frequency-shift keying on a carrier wave on a basis of an allocated number.

2. The wireless communication device according to claim 1, wherein the mapping circuitry allocates the numbers such that combinations of the numbers each allocated to one of the plurality of modulators are different for all values of an information bit sequence to be input.

3. The wireless communication device according to claim 1, wherein the modulators allocate initial phases of modulation symbols different from each other to the plurality of transmitting antennas.

4. The wireless communication device according to claim 1, further comprising a receiver to calculate a likelihood from a frequency component of a reception symbol and to perform maximum likelihood estimation on a basis of a mapping rule that is an allocation rule of the numbers in the mapping circuitry.

5. The wireless communication device according to claim 1, wherein the mapping circuitry defines a mapping rule that is an allocation rule of the numbers on a basis of a number of antennas of the transmitting antennas, and a modulation level and a modulation index of the modulators.

6. A control circuit that controls a wireless communication device including a plurality of transmitting antennas and a plurality of modulators that perform frequency-shift keying on carrier waves on a basis of numbers that are numbers each allocated corresponding to one of the plurality of transmitting antennas and for identifying carrier waves, the control circuit causing the wireless communication device to execute:
    allocating a number for identifying a carrier wave to each of the plurality of modulators on a basis of an input information bit sequence such that a plurality of transmission signals each transmitted from one of the plurality of transmitting antennas are orthogonal to each other, wherein
    the number for identifying the carrier wave allocated to each of the plurality of modulators is determined based on a minimum carrier interval at which two carrier waves of the carrier waves are orthogonal to each other,
    the allocating includes allocating numbers different from each other to the plurality of modulators.

7. A wireless communication method executed by a wireless communication device including a plurality of transmitting antennas and a plurality of modulators each corresponding to one of the plurality of transmitting antennas, the wireless communication method comprising:
    allocating a number for identifying a carrier wave to each of the plurality of modulators on a basis of an input information bit sequence such that a plurality of transmission signals each transmitted from one of the plurality of transmitting antennas are orthogonal to each other; and
    generating transmission signals each transmitted from one of the plurality of transmitting antennas by performing frequency-shift keying on carrier waves on a basis of numbers each allocated to one of the plurality of transmitting antennas, wherein
    the number for identifying the carrier wave allocated to each of the plurality of modulators is determined based on a minimum carrier interval at which two carrier waves of the carrier waves are orthogonal to each other, and
    the allocating includes allocating numbers different from each other to the plurality of modulators.

8. A non-transient storage medium having stored therein a program for controlling a wireless communication device including a plurality of transmitting antennas and a plurality of modulators that perform frequency-shift keying on carrier waves on a basis of numbers that are numbers each allocated corresponding to one of the plurality of transmitting antennas and for identifying carrier waves, the program causing the wireless communication device to execute:
    allocating a number for identifying a carrier wave to each of the plurality of modulators on a basis of an input information bit sequence such that a plurality of transmission signals each transmitted from one of the plurality of transmitting antennas are orthogonal to each other, wherein
    the number for identifying the carrier wave allocated to each of the plurality of modulators is determined based on a minimum carrier interval at which two carrier waves of the carrier waves are orthogonal to each other, and
    the allocating includes allocating numbers different from each other to the plurality of modulators.

9. A wireless communication device comprising:
    a plurality of transmitting antennas;
    a modulator to generate a transmission signal transmitted from each of the transmitting antennas by performing frequency-shift keying on a carrier wave on a basis of transmission data; and
    mapping circuitry provided in a preceding stage of the modulator to allocate carrier waves different from each other to the plurality of transmitting antennas such that a plurality of transmission signals each transmitted from one of the plurality of transmitting antennas are orthogonal to each other, wherein
    the mapping circuitry allocates the carrier waves such that combinations of the carrier waves each allocated to one of the plurality of transmitting antennas are different for all values of an information bit sequence to be input,
    the mapping circuitry allocates a number for identifying each carrier wave on a basis of the information bit sequence to be input, and
    the number for identifying each carrier wave is determined based on a minimum carrier interval at which two carrier waves of the carrier waves are orthogonal to each other.

10. A wireless communication device comprising:
    a plurality of transmitting antennas;
    a modulator to generate a transmission signal transmitted from each of the transmitting antennas by performing frequency-shift keying on a carrier wave on a basis of transmission data;
    mapping circuitry provided in a preceding stage of the modulator to allocate carrier waves different from each other to the plurality of transmitting antennas such that a plurality of transmission signals each transmitted from one of the plurality of transmitting antennas are orthogonal to each other; and
    a receiver to calculate a likelihood from a frequency component of a reception symbol and to perform maximum likelihood estimation on a basis of a mapping rule that is an allocation rule of the carrier waves in the mapping circuitry.

* * * * *